United States Patent [19]
Chamney et al.

[11] Patent Number: 5,828,969
[45] Date of Patent: Oct. 27, 1998

[54] PROCESS FOR USE WITH AIRCRAFT REPAIRS

[75] Inventors: Lyle James Chamney, Calgary; Garry Steve Lynchuk, Saskatoon, both of Canada

[73] Assignee: Canadian Digital Photo/Graphics Inc., Calgary, Canada

[21] Appl. No.: 493,471

[22] Filed: Jun. 22, 1995

[51] Int. Cl.[6] .................................................. G06F 19/00
[52] U.S. Cl. .............................. 701/29; 701/35; 364/507
[58] Field of Search .................. 364/424.34, 424.038, 364/424.04, 507, 508, 550, 551.01; 374/4–7; 378/58; 348/113, 117, 125, 128

[56] References Cited

U.S. PATENT DOCUMENTS

| | | | |
|---|---|---|---|
| 4,647,220 | 3/1987 | Adams et al. | 374/5 |
| 4,803,639 | 2/1989 | Steele et al. | 364/507 |
| 5,272,769 | 12/1993 | Strnatka et al. | 364/424.034 |
| 5,539,656 | 7/1996 | Annigeri et al. | 364/507 |

*Primary Examiner*—Gary Chin
*Attorney, Agent, or Firm*—Millen, White, Zelano, & Branigan, P.C.

[57] ABSTRACT

The process provides for improved control of the repair of aircraft damage. The process involves: photographing aircraft damage using a digital camera; inputting the digital visual data and descriptive information into a computer database to produce a record; and electronically transmitting the record into a compatible database at a facility of the manufacturer of the aircraft, so that the recipient may produce the record, visually assess the damage and prepare instructions for the best possible repair according to relevant regulations and send them to the operator. In an additional embodiment, digital photographs and records of a repair are similarly produced and electronically transmitted so that the manufacturer may ensure operator's compliance with the instructions.

6 Claims, 7 Drawing Sheets

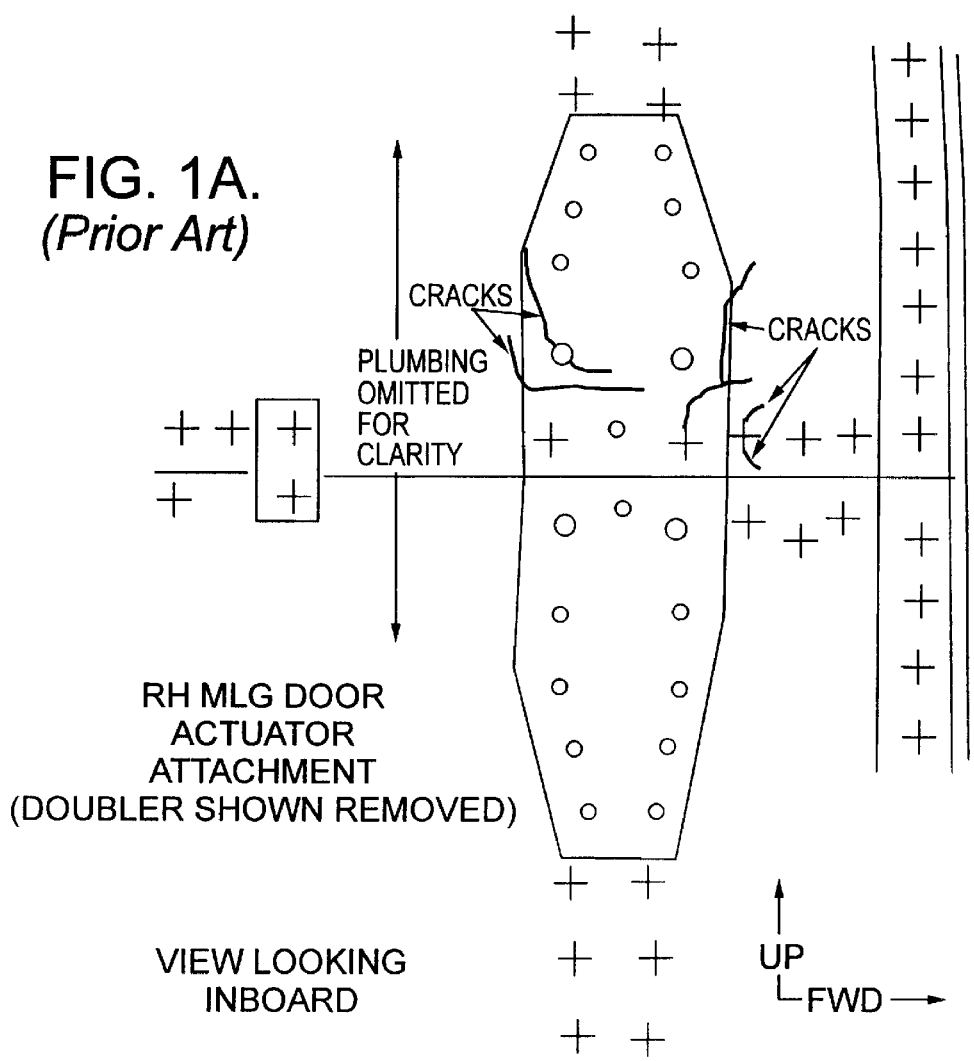

FIG. 1A.
*(Prior Art)*

RH MLG DOOR ACTUATOR ATTACHMENT
(DOUBLER SHOWN REMOVED)

VIEW LOOKING INBOARD

FIG. 1B.
*(Prior Art)*

Comments on Sketch:
   Re: RH MLG Bay, Inboard Wall - cracks at MLG door fwd. actuator, upper attachment.
   There has been similar damage to this a/c as on a/c s/n XXXXX, your ref. YYYYY. However, XXXXX has damage to the skin as indicated in the sketch. We will be ordering "T"-section p/n a30956-049 as it is badly cracked at the upper end. The plate as mentioned in (3.) of your fax, is "oil canned" a bit, but we will see how it "releases" when drilled off. Anyway, what we REALLY NEED is a repair for the skin cracks under the doubler.

PROCESS FOR USE WITH AIRCRAFT REPAIRS

FIELD OF THE INVENTION

This invention relates to an aircraft maintenance control process which contributes to continued compliance of equipment to regulatory standards. The process involves photographing a damaged component and electronically transmitting a database record of the resulting digital image to an authorized agent (for example, the manufacturer) to obtain repair instructions.

BACKGROUND OF THE INVENTION

Some types of equipment are subject to strict regulatory control, particularly where failure can result in the probable endangerment of human life.

More particularly, in the aircraft industry the United States Federal Aviation Administration (FAA) and Transport Canada (TC) regulate the design, maintenance and operation of aircraft.

In Canada, TC sets standards of airworthiness for each aircraft and requires that regular maintenance be performed on aircraft components. If the standards are complied with, a Certificate of Airworthiness is issued. Any variation in the aircraft's physical characteristics, such as through maintenance, repairs or alterations, must comply with the standards set forth.

Under the auspices of TC and the Air Regulations and Aeronautics Act and Air Navigation Order series II, No. 4, s.5 (SOR/83-537), if an aircraft does not conform to the specified standards of airworthiness, a Certificate of Airworthiness will not be in force. Further, under Air Regulations s.210 an operator is statutorily prohibited from attempting flight with that aircraft.

TC designates those persons or organizations who can assess or certify conformance as "authorized agents".

For example, in the case where damage to an aircraft is detected, an authorized agent must be consulted by the maintenance facility to ascertain if any action is required for the equipment to comply with the requirements for the certification of airworthiness.

There is good reason to maintain this high level of regulation as evidenced by the tragic loss of 524 lives in a 1985 Japan Air Lines' Boeing 747 crash in Japan. The crash was traced to a faulty repair of a rear pressure bulkhead. In another spectacular case, in which remarkably only one life was lost, 18 feet of the upper fuselage of an Aloha Airlines Boeing 737, tore off while in flight at an altitude of 24,000 feet. The failure occurred due to disbanding and fatigue damage of a lap joint. These events are re-visited below.

The current system for reporting the physical characteristics of component damage and obtaining a repair assessment is presented in FIGS. 1a, 1b and 2. In this case, the maintenance facility of the operator of the aircraft prepared a hand sketch of cracking damage (FIG. 1a) sustained by the structure of an aircraft wheel well. A textual description accompanied the sketch (FIG. 1b). The information was sent by facsimile to the original aircraft manufacturer as an authorized agent. An action report for repair was issued.

In accordance with the prior art system, in assessing the damage, the agent had to rely upon their familiarity with the aircraft, prior experience with this particular failure, and trust that the second-hand information from the operator fully disclosed and identified the damage. This prior art process is represented in the flow chart of FIG. 2. The process comprises:

the operator prepares a sketch of the damage, annotating text, descriptive of the damage, to the sketch and then sending it (typically by mail or facsimile) to an authorized agent (such as the aircraft manufacturer);

the authorized agent assesses the damage and prepares an action report which details, whether the action or repair is recommended or mandatory, whether the repair must be performed immediately or may be delayed to permit scheduling, and an action report specifying an engineered solution with respect to the repair;

the authorized agent then sends the action report to the operator.

The operator then:

has the repair performed and certified by an authorized agent as complying with regulatory standards; and updates the aircraft's maintenance log and complete a conformity certificate which notifies TC that an authorized repair or modification has been made in conformance with the statutory requirements.

An action report will render the Certificate of Airworthiness as having no force either upon expiry of the specified delay or immediately. The Certificate of Airworthiness will continue to have no force until such time as the operator has had an appropriate repair certified by an authorized agent.

There are several disadvantages associated with this system.

The quality of the assessment of the damage by the authorized agent depends almost entirely upon the operator's own interpretation of the damage which may fail to accurately disclose the full nature or location of the damage or any secondary considerations;

usually TC is not informed that an action report was even issued, thus permitting bypassing of the regulatory body;

If the operator does not report that any action was taken, neither the authorized agent or TC could know if the action was ever performed, or performed properly. This aspect was clearly identified by the U.S. National Transportation Safety Board in the Aloha Airlines case (above) where five inspection and repair action reports had been issued but had not been duly entered by the operator, Aloha Airlines, into their maintenance records, nor could any actual inspection or repairs be confirmed (as reported in a seven part weekly feature in Aviation Week and Space Technology, Aug. 28, 1989 through Nov. 13, 1989 issues); and Even if TC was informed that an action report had issued, confirmation of the operator's compliance is only checked during an occasional audit. An audit only compares the action specified in an action report against maintenance log entries and rarely validates by direct physical inspection.

With this background in mind, it was the objective of the present invention to provide an improved equipment maintenance control system which minimizes interpretation distortions and thereby improves the quality of the communication between aircraft operators and regulatory-authorized agents, permitting faster and superior quality action, better overall regulation, and safer aircraft.

SUMMARY OF THE INVENTION

The present invention relates to a process for improving the format in which aircraft damage and repair instructions are reported between the aircraft operator and the authorized agents responsible for ensuring continued compliance of the aircraft with relevant regulations.

In one feature of the process, the aircraft operator transmits digital visual data of a damaged component of an aircraft to the authorized agents for their assessment of the appropriate repair and preparation of repair instructions.

In one broad aspect then, a novel process for use by an aircraft repair operator to obtain repair procedure instructions from an authorized agent is practised comprising:

obtaining digital visual data of an aircraft component to be repaired, preferably using digital photography or video;

obtaining descriptive data describing the aircraft component and rendering the obtained descriptive data digitally, preferably comprising oral, written and graphical data;

Inputting the obtained digital visual data Into a computer database to produce one or more database records;

annotating the obtained digital descriptive data to the database record or records in the computer database which were produced for the component, for describing and uniquely identifying the aircraft component;

electronically transmitting the database record or records for inputting into a compatible database located at a remote facility of the authorized agent and producing a visual representation of the record's or records' digital visual and descriptive verbal data, the recipient at the remote facility preparing instructions for the proper implementation of a repair in accordance with relevant regulations;

returning the repair instructions back to the aircraft operator, preferably in print, or more preferably as a reciprocal electronic transmission; and conducting the repair to the aircraft component in accordance with the returned repair instructions.

In another feature of the process, the authorized agent or regulatory body may more closely control the repair or alteration of aircraft. After having performed the repair according to the above process, the aircraft operator repeats the process so as to transmit digital visual data of the now altered aircraft component to the authorized agents for their assessment of the operator's compliance with the instructions and the regulations.

More particularly then, once the repair instructions are received, and the repair procedure is performed, the process comprises repeating the preceding steps for the newly repaired aircraft component by obtaining digital visual data, obtaining digital descriptive data, inputting the obtained digital visual data and the descriptive verbal data Into the computer database, and transmitting the produced database record or records to the authorized agent or regulatory body, so that a recipient at the remote facility may assess the operator's compliance with the repair Instructions and the compliance of the repaired aircraft component with the regulations.

In yet another aspect, the aircraft is assigned a non-compliance status which is maintained until such time as the authorized agent or regulatory body has assessed the operator's compliance with the instructions and the compliance of the aircraft component with the regulations.

BRIEF DESCRIPTION OF THE DRAWINGS

FIGS. 1a and 1b represent a sketch, having had descriptive text added, which are typical of the prior art;

DETAILED DESCRIPTION OF THE PREFERRED EMBODIMENT

The invention is described in terms of cracking damage which was detected within the wheel well of a Fokker F-28 Mark 1000 aircraft.

Figure 2:
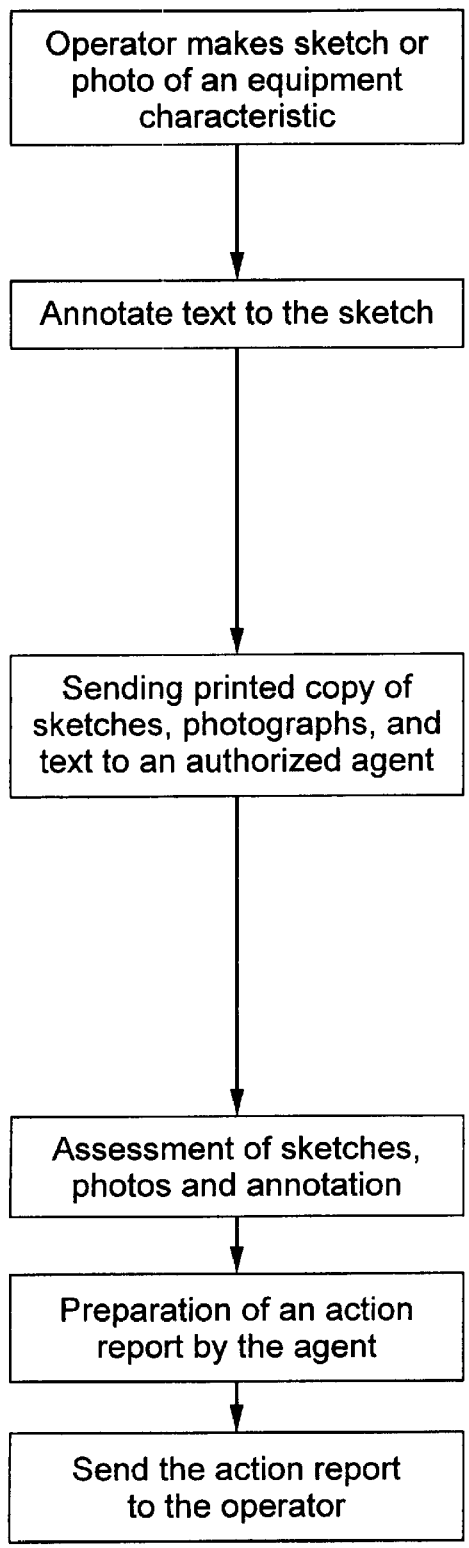
FIG. 2 is a schematic flow chart depicting the system of the prior art.
Figure 3:
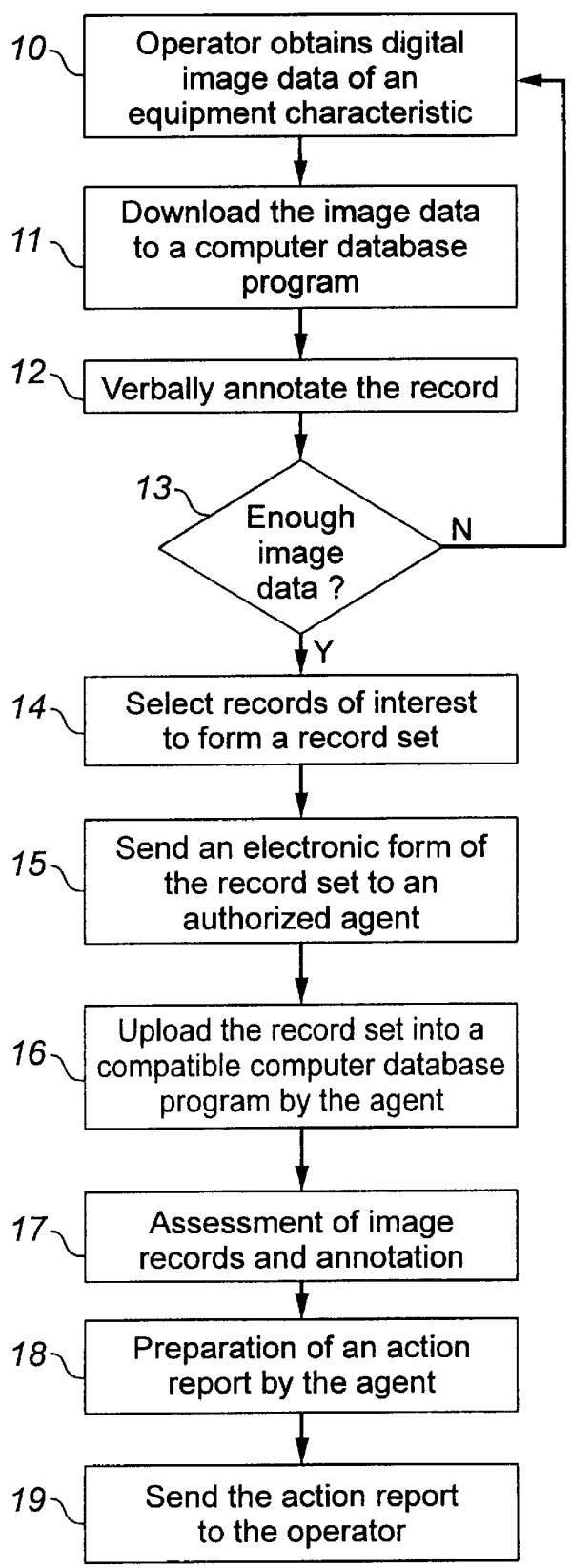
FIG. 3 is a schematic flow chart depicting one embodiment of the maintenance control system of the invention.

Having reference to FIG. 3, at block 10, the operator of the equipment first gathers information related to the location of the damage, its seriousness and whether any secondary effects are noted.

Figure 4:
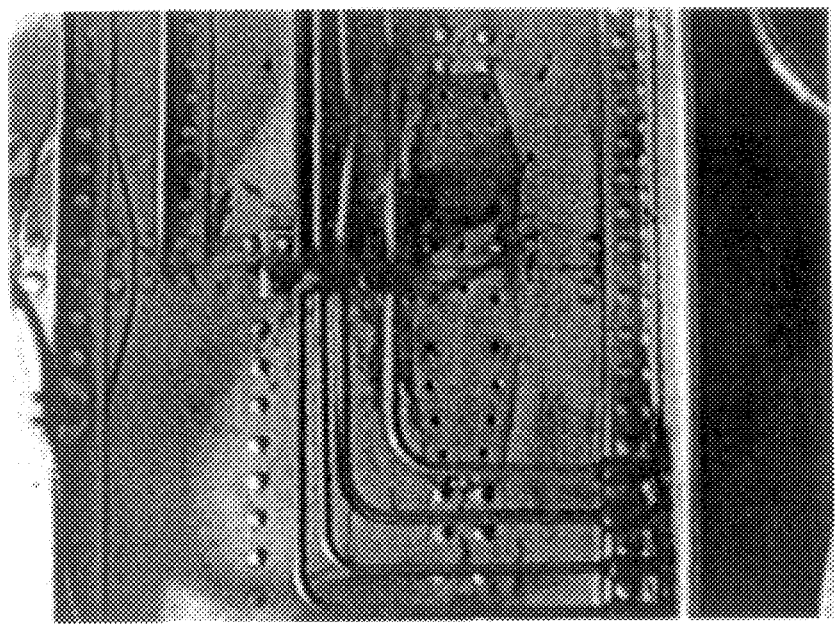
FIG. 4 is a line drawing representation of a digital photographic image taken of aircraft fuselage cracking damage.

This comprises obtaining one or more photographic images (FIG. 4) of the damage. The particular physical characteristic of the equipment must be capable of being rendered into a visual form, such as by photograph or X-ray image.

These pictures or images are rendered into a digital format suitable for computer storage. The preferred method of obtaining the image is to use digital photography (such as the Apple QuickTake 100 digital camera, manufactured by Apple Computer Inc., Cupertino, Calif.) although digital capture of a video frame or digital scanning of a photograph can yield similar results with varying degrees of resolution and quality.

Next, at block 11, the digital image is downloaded into a computer database capable of storing and presenting image data. This image-capable database is created using a database development software tool such as Lotus Approach (software produced by Lotus Development Corporation, Cambridge, Mass. for Intel chip-based personal computers).

Generally, in its simplest form, a computer program stores information in a computer database having a tabular format of rows and columns. Each row or record comprises a series of columnar compartments called fields. The types of fields may include a combination of image fields which can store photographs, and a series of character fields providing textual information.

Each image field stores the information necessary for defining the format of the image's in its original acquired form, including resolution, size, color and structure (i.e. bits per pixel).

Figure 5:
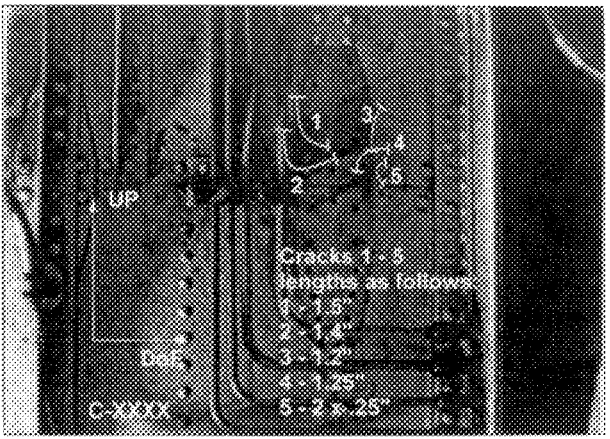
FIG. 5 is a printed representation of a database record illustrating both the image according to FIG. 4 and annotated text.

Next, at block 12, it is essential that some verbal information (in its broadest sense-textual or digitally oral) be annotated or added to each image by entering it into each record. This information is typically inputted in a textual format so as to better describe the damage (i.e. text detailing measurements of the cracks) and uniquely identify the record (ie. the aircraft's registration number) for facilitating later retrieval (FIG. 5). Textual information may be also superimposed onto the visual image field using specialized image editing computer software such as CORELDraw (CORELDraw v.5 available from Corel Corporation, Ottawa, Ontario). Both text and graphical elements can be superimposed; some of the graphical elements shown on FIG. 5 include linear lines (as UP and DoF axes), and curved lines (highlighting the path of the cracks).

While one image may be suitable to illustrate some characteristics, some large or complex ones may require multiple views.

With a loop shown at block 13, multiple images and records are added repeatedly as would be required to permit an authorized agent to form an accurate understanding of the damage. The computer database creates a unique database record for each image obtained, although some programs could be configured to accept multiple images and place them in multiple image fields per record.

Next, at block 14, once the record's fields have been completed, the operator then performs a database query to select the records of interest. A database query performs a search for related records, based upon commonalities found between specified fields of different records.

The search will identify and create a subset of the database, or a primary record set, which contains one or more records. The primary record set defines the physical characteristic or damage of interest.

At block 15, this primary record set is then sent to the authorized agent for their assessment of the damage. It is essential that this record set be provided in an electronic, digital format.

In the interest of receiving a timely response, the primary record set is transmitted electronically to the authorized agent using inter-computer communications software such as COMit for Windows, v.1.13 (available from Tradewinds Software, copyrighted, Microwerks, 1993).

At block 16 the agent uploads the primary record set into a compatible image-capable database. The digital form of the information in the record set permits the agent to use an appropriate computer program to assess the damage (at Block 17) by manipulating and viewing the image with a precision equal to that as was obtained by the operator, limited only by the original resolution of the original image as it was acquired.

At block 18, the agent prepares an action report which details what action must be taken by the operator for the Certificate of Airworthiness to remain valid. This action normally comprises an engineered solution set forth in drawings and text, such as modifications or repairs.

Finally, at block 19, the agent sends this action report back to the operator in a verbal or electronic form.

The system of the present invention substantially eliminates the likelihood of distortion due to an operator's individual interpretation of the damage. This then results in a more accurate representation of the data being provided to the agent. Consequently, the agent's assessment and engineered solution would be optimal.

Figure 6:
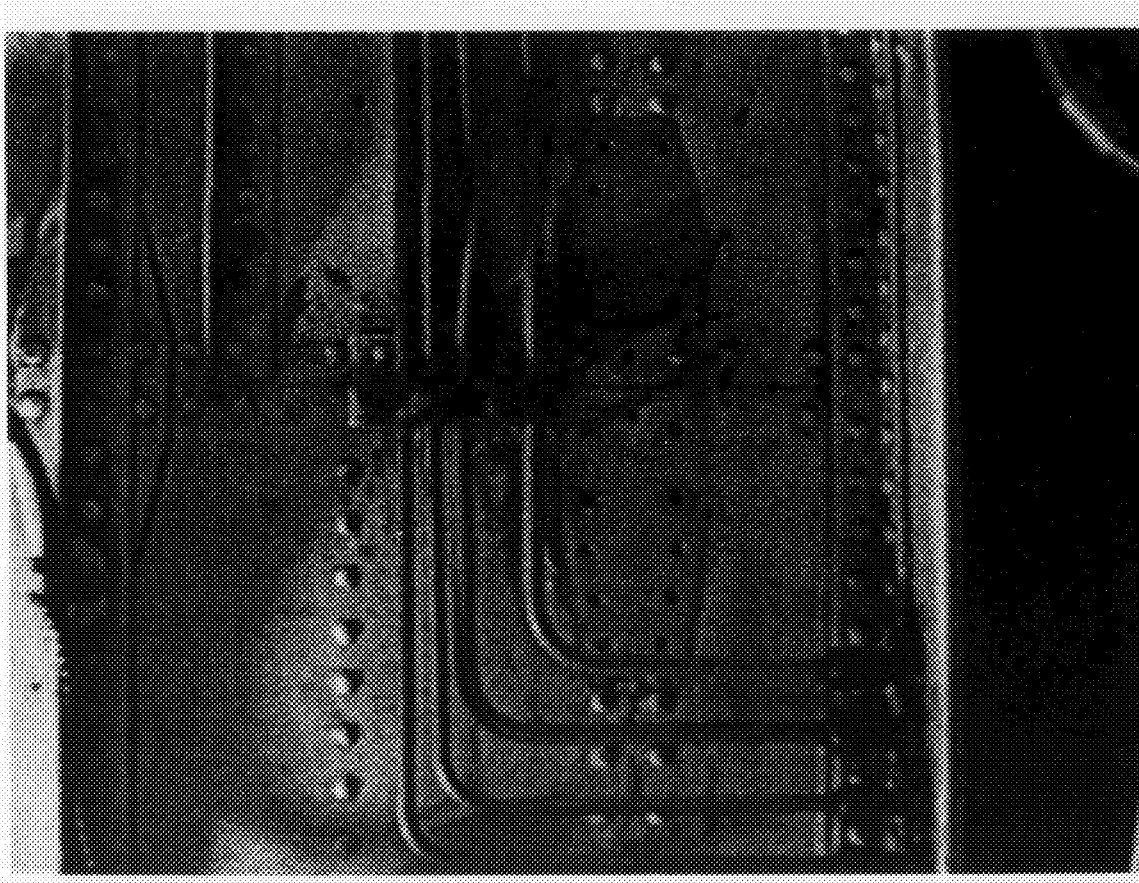
FIG. 6 is a line drawing representation illustrating the image scaling capabilities made available to the agent due to the digitally preserved image resolution and format.

More specifically in this example, this image system results in the following advantages over the prior art sketch approach. The image:

illustrates the presence of nearby stringers and stiffeners, not depicted on the original sketch;

provides an exact reference of the location of the site and the extent of the damage, as evidenced by the presence of identifiable features and the spacing, determined by the number of rivets;

illustrates the condition of adjacent structures which could impact upon the recommended course of action;

permits the agent to manipulate (scale up) the image for a more detailed inspection (FIG. 6). The extent of scaling is limited only by the original resolution of the image; and permits the economical and enduring storage of maintenance records in a compact, yet precise digital format.

Figure 7:
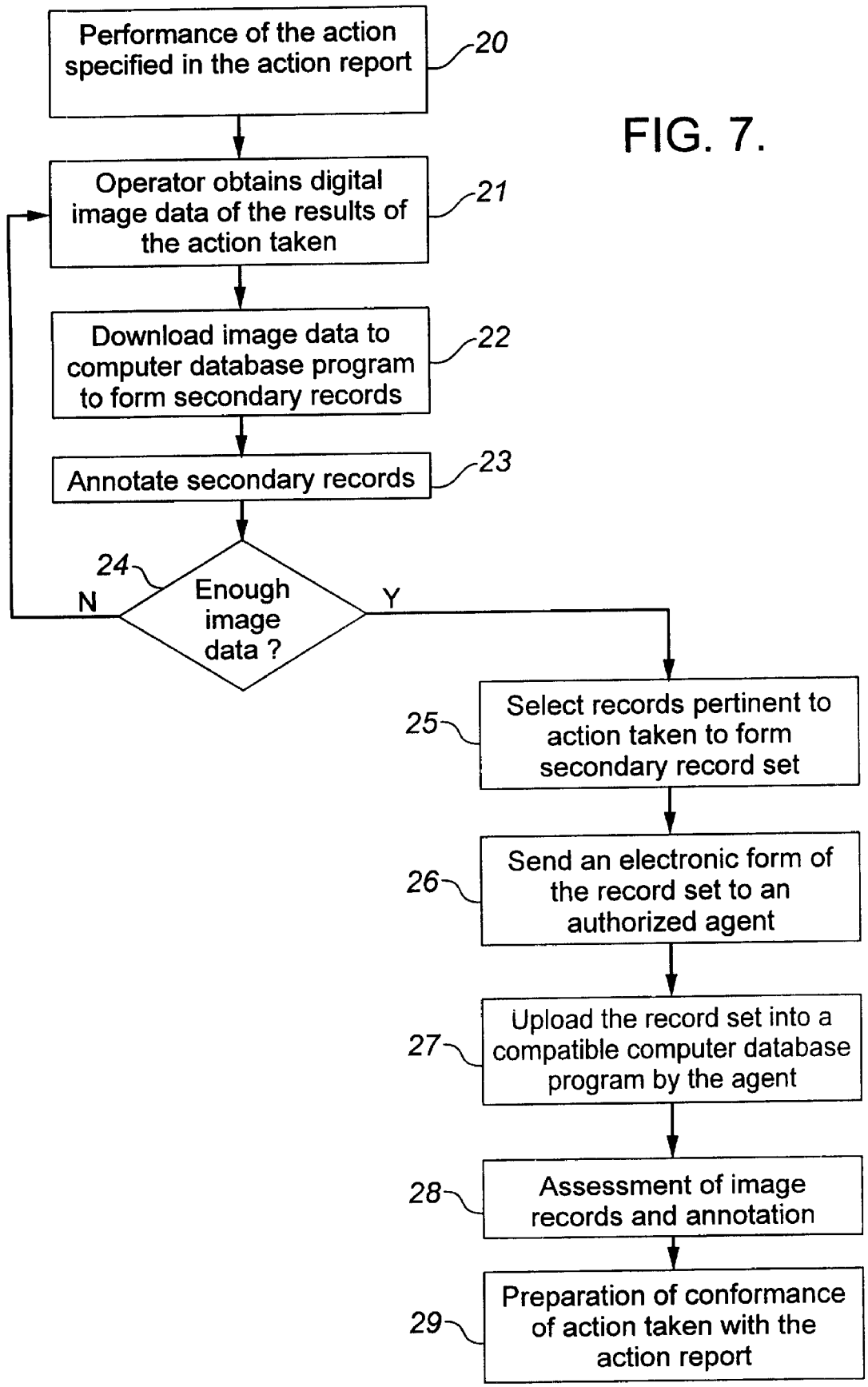
FIG. 7 is a schematic flow chart depicting an additional and alternate embodiment of the maintenance control system of the invention.

In another embodiment of the invention, an extended equipment control system is provided as shown in FIG. 7.

This control system comprises performing a two stage operation. The primary stage is merely a repeat of the steps outlined above in the first embodiment and FIG. 3. The second stage, as shown in FIG. 7, comprises superadding steps to the primary stage, whereby the operator's compliance with the action specified in the action report may be confirmed by the authorized agent.

In the primary stage, as previously shown in FIG. 3, the operator first obtains digital photos of the damage. The photos are downloaded into the database and are annotated. A search of the database is performed and a primary record set is extracted. The primary record set is sent in electronic form to an authorized agent for assessment. The agent uploads the primary record set and uses a compatible database program to view the image, assess the damage and prepare an action report. The action report is sent to the operator.

In the second stage, shown in block 20 of FIG. 7, after having received an action report from the agent, the operator arranges to have the specified action (repair) performed and certified by an authorized agent. This agent may or may not be the same agent as had prepared the action report.

Figure 8:
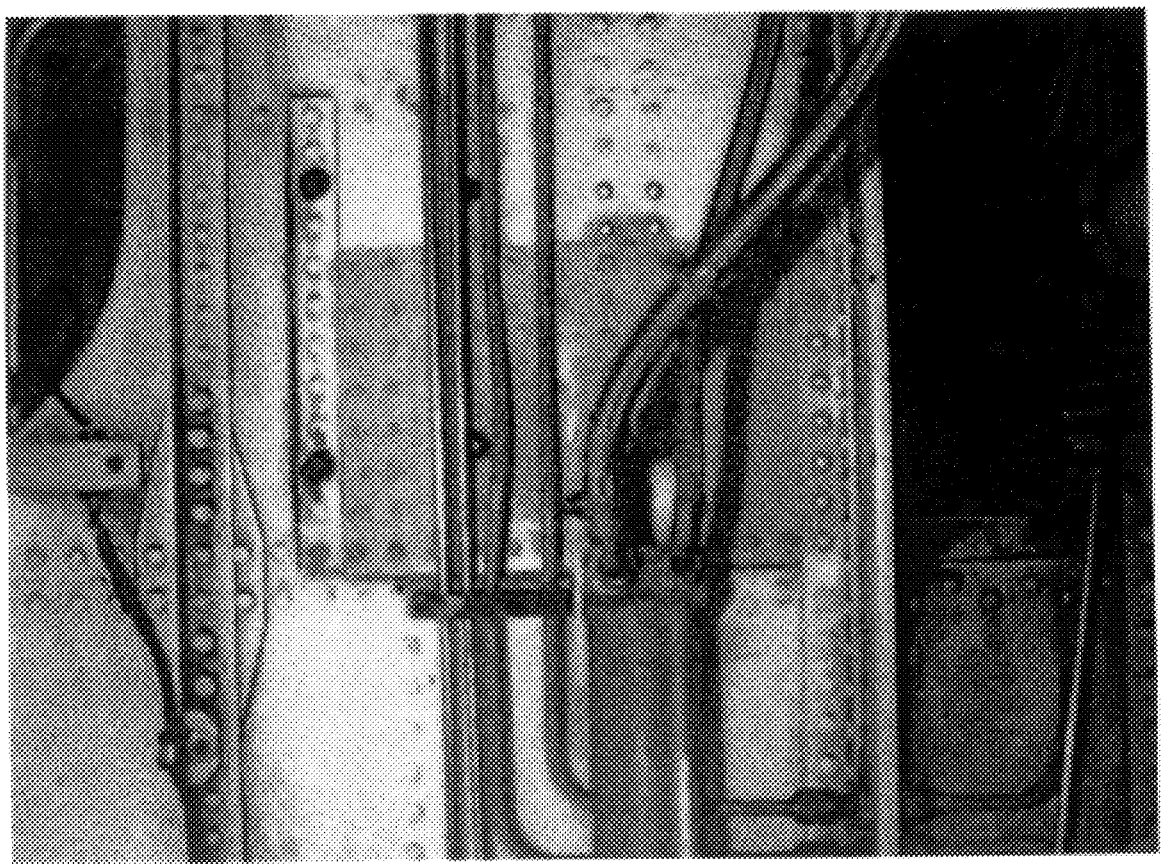
FIG. 8 is a line drawing representation of a digital photographic image taken of a repair made in accordance with an action report provided in response to the damage according to FIG. 4.

Then, at blocks 21 through 27, much like the primary stage, photos are obtained of the repair (block 21). In a continuance of the earlier cracking example, FIG. 8 shows a patch and connection strip repair over the cracking damage. At block 22, the photos are downloaded into the database and are annotated at block 23. In a loop shown at block 24, blocks 21–23 are repeated as required to permit the performed action to be sufficiently described for assessment by the agent. Then, at block 25, a search of the database is performed and a secondary record set is selected. At block 26, the secondary record set is sent in electronic form to the authorized agent. At block 27, the agent uploads the secondary record set and uses the compatible database to assess the secondary record set at block 28.

In this way, at block 29, the agent can ensure that the repair (FIG. 8) complied with the action report and indeed warrants continuance of the Certificate of Airworthiness in compliance with the regulatory body's standards.

In a 1993 example, an operator originally found a dent on the belly of an aircraft fuselage. The dent characteristics were beyond the manufacturer's specified limits. An annotated sketch was made and sent to the manufacturer. An action report was issued to the operator which specified the necessary repair. No further correspondence ensued. The aircraft ownership changed. In 1995, over 1.5 years after the dent was originally found, the new operators re-discovered the dent, sent a report into the manufacturer and were told there had already been an action report issued. The repair had not been performed in accordance with the 1993 action report and thus, for 1.5 years, the aircraft had been in service without a valid Certificate of Airworthiness.

Using the system of the second embodiment, receipt of an image of a repair of the dent would have been anticipated by the issuing agent. If evidence of the repair was not forthcoming within the time constraints placed by the manufacturer, the agent would then have been aware of an interruption of the system and the appropriate steps could have been initiated.

In the case of the Aloha Airlines example above, action reports had been issued yet the specified inspections and repair work was not performed. If the system of the present invention had been in place, then lack of a follow-up secondary image record set would have alerted the authorized agent and perhaps this failure may have been averted.

In the Japan Air Lines example above, if a secondary image set had been obtained, it is conceivable that the lack of a continuous doubler lap joint repair would have been identified and the tragedy averted.

In yet another embodiment, the regulatory body could be notified by the authorized agent whenever an action report issued. Like the agent, the regulatory body could upload the pertinent record set. The regulatory body could then suspend the Certificate of Airworthiness until such time as a satisfactory secondary record set was received. In this way, the maintenance and modification of regulated equipment would be directly and closely controlled by the regulatory body.

The embodiments of the invention in which an exclusive property or privilege is claimed are defined as follows:

1. A process for use by an aircraft operator to obtain repair procedures instructions from an authorized agent, comprising:
   (a) obtaining visual data of an aircraft component to be repaired using digital imaging means;
   (b) obtaining descriptive data describing the aircraft component and rendering the obtained descriptive data digitally;
   (c) inputting the obtained digital visual data into a computer database to produce one or more database records;
   (d) annotating the obtained digital descriptive data to the database record or records in the computer database which were produced for the component, for describing and uniquely identifying the aircraft component;
   (e) electronically transmitting the database record or record for inputting into a compatible database located at a remote facility of the authorized agent and producing a visual representation of the record's or records' digital visual and digital descriptive data, the recipient at the remote facility preparing instructions for the proper Implementation of a repair in accordance with relevant regulations;
   (f) returning the repair instructions back to the aircraft operator; and
   (g) conducting the repair to the aircraft component in accordance with the returned repair instructions.

2. The process of claim 1 wherein said digital imaging means is a digital photograph.

3. The process of claim 1 wherein said digital imaging means is a video image.

4. A process for use by an authorized agent or regulatory body to control the repair of aircraft by an aircraft operator comprising:
   (a) obtaining visual data of an aircraft component to be repaired using digital imaging means;
   (b) obtaining descriptive data describing the aircraft component and rendering the obtained descriptive data digitally;
   (c) Inputting the obtained digital visual data into a computer database to produce one or more database records;
   (d) annotating the obtained digital descriptive data to the database record or records In the computer database which were produced for the components for describing and uniquely identifying the aircraft component;
   (e) electronically transmitting the database record or records for inputting into a compatible database located at a remote facility of the authorized agent or regulatory body and producing a visual representation of the record's or records' digital visual and digital descriptive data, the recipient at the remote facility preparing Instructions for the proper implementation of a repair in accordance with relevant regulations;
   (f) returning the repair instructions back to the aircraft operator;
   (g) conducting the repair to the aircraft component in accordance with the returned repair instructions; and
   (h) repeating the preceding steps for the newly repaired aircraft component by obtaining digital visual data, obtaining digital descriptive data, inputting the obtained digital visual data and the digital descriptive data Into the computer database, and transmitting the produced database record or records to the authorized agent or regulatory body, so that a recipient at the remote facility can assess the operator's compliance with the repair instructions and the compliance of the repaired aircraft component with the regulations.

5. The process of claim 4 further comprising the steps of:
   (i) assigning the aircraft a non-compliance status upon the preparation of the repair instructions; and
   (j) maintaining the non-compliance status until such time as the authorized agent has assessed the operator's compliance with the repair instructions and the compliance of the repaired aircraft component with the regulations.

6. The process of claim 1 or 4 wherein said obtained digital descriptive data comprises oral, written and graphical data.

* * * * *